July 30, 1968     E. P. WHITLOW ET AL     3,394,926
ABSORBER APPARATUS FOR A REFRIGERATION SYSTEM
Filed May 26, 1964     2 Sheets-Sheet 1
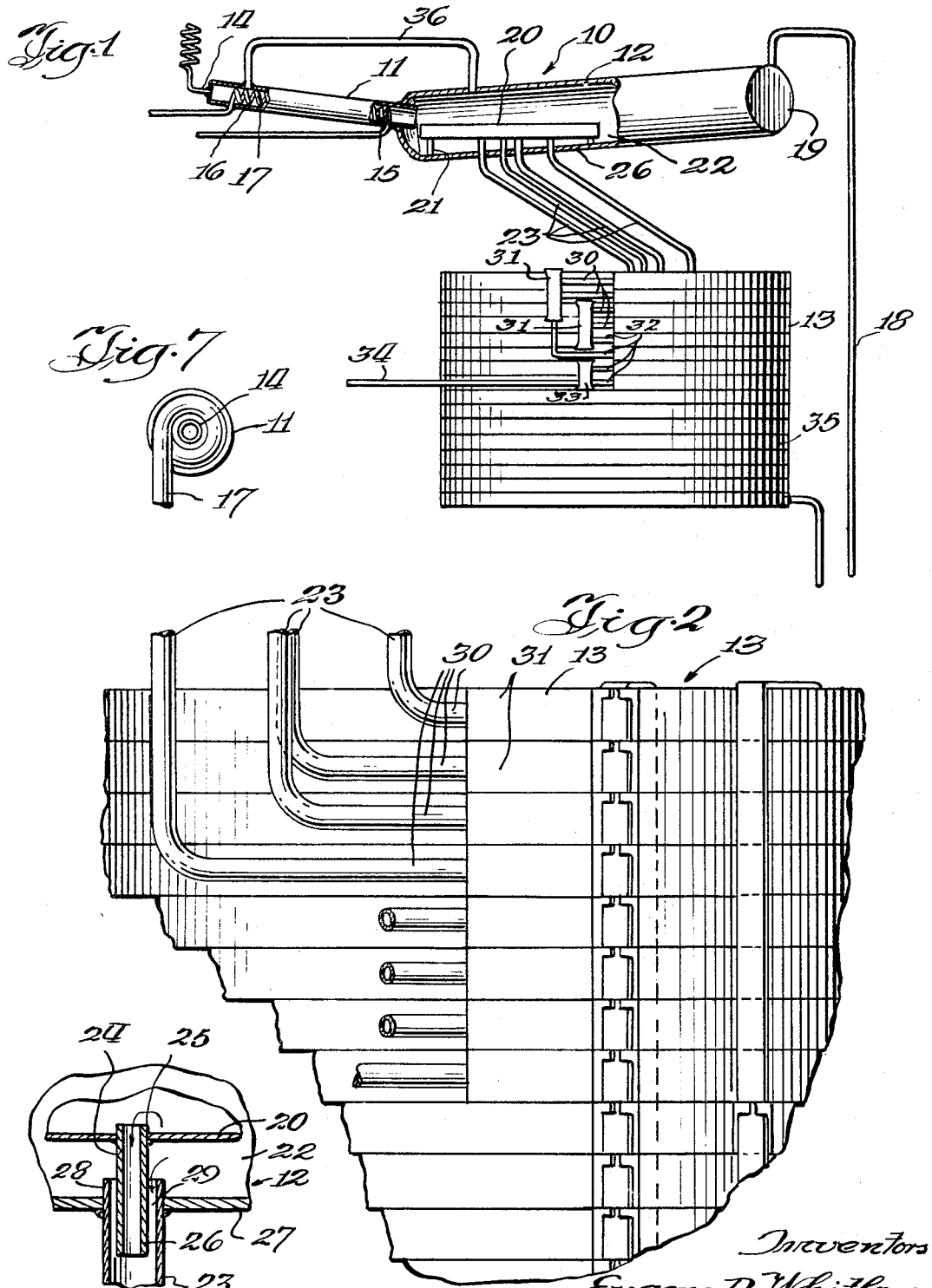

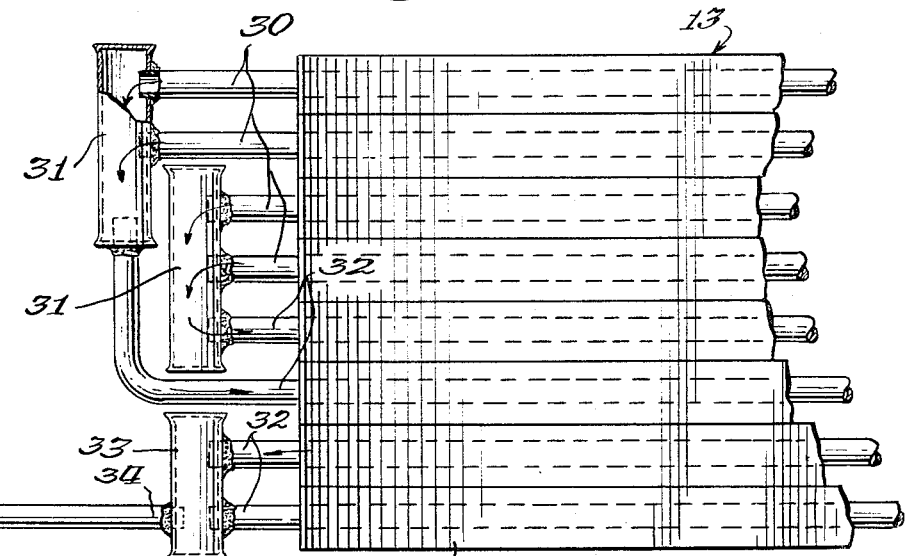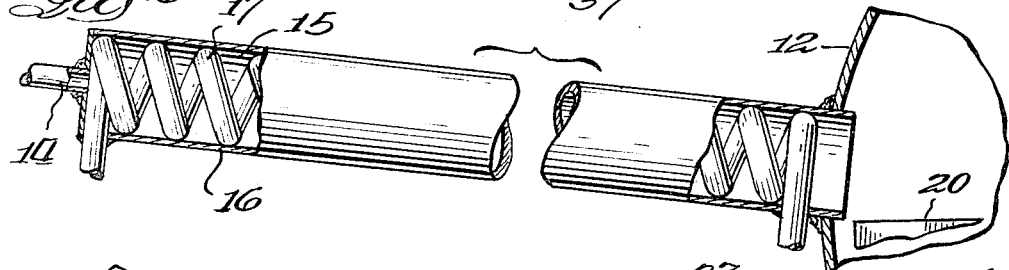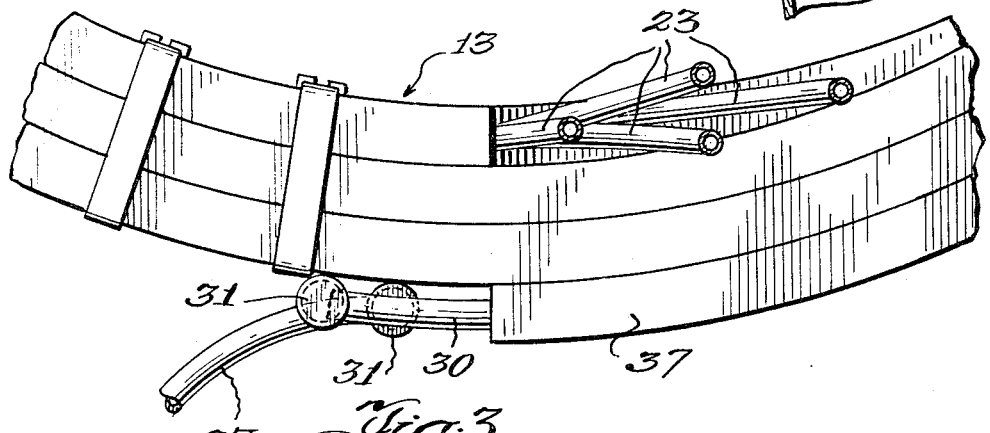

United States Patent Office 3,394,926
Patented July 30, 1968

3,394,926
ABSORBER APPARATUS FOR A REFRIGERATION SYSTEM
Eugene P. Whitlow, St. Joseph, Mich., and Hiroshi Shimotake, Downers Grove, Ill., assignors to Whirlpool Corporation, a corporation of Delaware
Filed May 26, 1964, Ser. No. 370,269
2 Claims. (Cl. 261—140)

This invention is concerned with absorber apparatus and in particular with absorber apparatus for use with refrigeration systems.

In one well known form of refrigeration system, refrigerant gas such as ammonia is absorbed in a liquid such as water in an absorber portion of the refrigerator structure. The present invention comprehends an improved absorber apparatus for use in such a refrigeration system.

Thus, a principal feature of the present invention is the provision of a new and improved absorber apparatus.

Another feature of the invention is the provision of such an absorber apparatus having new and improved means for absorbing the refrigerant gas in the liquid.

A further feature of the invention is the provision of such an absorber apparatus including means defining a first fluid flow passage, means for delivering a liquid into the passage at a preselected flow rate, means for delivering a refrigerant gas into the passage at a preselected flow rate for absorption into the liquid therein, and means defining a second fluid flow passage having a fluid flow capacity less than that of the first passage and communicating with the first passage at a preselected point thereof whereat the gas volume is reduced as a result of the absorption thereof into the liquid to provide a reduced flow rate corresponding to the flow capacity of the second passage.

Still another feature of the invention is the provision of such an absorber apparatus including means defining a first fluid flow passage, means for delivering a liquid into the passage at a preselected flow rate, means for delivering a refrigerant gas into the passage in an annular distribution about the liquid at a preselected flow rate for absorption radially inwardly into the liquid therein, and means defining a second fluid flow passage having a fluid flow capacity less than that of the first passage and communicating with the first passage at a preselected point thereof whereat the gas volume is reduced as a result of the absorption thereof into the liquid to provide a reduced flow rate corresponding to the flow capacity of the second passage.

Still another feature of the invention is the provision of such an absorber apparatus including a heat exchanger section wherein weak liquid is caused to travel through a chamber in a first direction, refrigerant vapor is caused to pass through the chamber in a second opposite direction to be absorbed in the weak liquid therein, and relatively cold, rich liquid is conducted in heat exchange association with the weak liquid in the chamber to absorb heat from the weak liquid resulting from the absorption of the refrigerant vapor therein.

A yet further feature of the invention is the provision of such an absorber apparatus including means defining a heat exchanger wherein heat absorbent liquid is caused to flow in one direction and refrigerant gas is caused to flow in an opposite direction in contact with the liquid to be absorbed therein, the heat exchanger being constructed to retain the gas therein until the liquid phase and gas phase are in equilibrium at the temperature of the liquid being delivered thereto, means defining a first fluid flow passage and communicating with the heat exchanger to receive liquid at a preselected flow rate, means for delivering a refrigerant gas into the passage at a preselected flow rate for absorption into the liquid therein, and means defining a second fluid flow passage having a fluid flow capacity less than that of the first passage and communicating with the first passage at a preselected point thereof whereat the gas volume is reduced as a result of the absorption thereof into the liquid to provide a reduced flow rate corresponding to the flow capacity of the second passage.

Other features and advantages of the invention will be apparent from the following description taken in connection with the accompanying drawing wherein:

FIGURE 1 is a front elevation of an absorber apparatus embodying the invention, with portions broken away to facilitate illustration thereof;

FIGURE 2 is a fragmentary enlarged elevation of a portion of the air cooled absorber structure;

FIGURE 3 is a fragmentary top plan view thereof;

FIGURE 4 is a further fragmentary elevation thereof;

FIGURE 5 is a fragmentary enlarged vertical section illustrating the arrangement of the inlet to the conduits connecting the absorber pot assembly to the air cooled absorber structure;

FIGURE 6 is a fragmentary enlarged elevation with portions broken away of the heat exchanger portion of the absorber pot assembly; and FIGURE 7 is an end view thereof.

In the exemplary embodiment of the invention as disclosed in the drawing, an absorber apparatus generally designated 10 is shown to comprise a heat exchanger 11, an absorber pot assembly 12, and an air cooled absorber coil structure 13. In the apparatus 10, absorption of a refrigerant, such as ammonia vapor, in an absorbent, such as water, takes place firstly in the heat exchanger 11 and then in the coil structure 13.

Weak liquid, herein comprising water having a small percentage of ammonia dissolved therein, is delivered at high temperature through an inlet 14 into one end of the chamber 15 defined by the outer housing 16 of the heat exchanger 11. Relatively cold, rich liquid, comprising water having a high concentration of ammonia dissolved therein, is passed through a coil 17 extending coaxially within the chamber 15 to have heat exchange relationship with the weak liquid flowing downwardly through the chamber 15. Cold ammonia vapor is delivered through a conduit 18 into an opposite end 19 of the absorber pot 12. As the weak liquid flows downwardly through the chamber 15, it begins to absorb ammonia vapor and the resultant heat of absorption is transferred to the relatively cold, rich liquid in the coil 17. When the weak liquid reaches the lower end of the chamber 15, it has absorbed a substantial quantity of refrigerant ammonia vapor thereby comprising a partially rich liquid.

At the same time that the weak liquid is becoming partially richer by the absorption of refrigerant vapor therein in chamber 15, the refrigerant vapor becomes richer in water vapor. Thus, the equilibrium absorption temperature at the inlet 14 of the heat exchanger is substantially higher than it would be if the refrigerant vapor were delivered with the weak liquid at the inlet 14. The higher absorption temperature permits more heat energy to be transferred to the relatively cold, rich liquid in coil 17 thereby substantially increasing the efficiency of the apparatus.

The partially rich liquid delivered from chamber 15 drops onto a trough 20 carried on suitable legs 21 within the internal space 22 of the absorber pot 12. The trough 20 functions to divide the partially rich liquid volume into four substantially equal streams. Four conduits 23 are connected between the air cooled absorber 13 and the trough 20 for conducting the weak liquid and refrigerant gas to the absorber for absorption of the refrigerant gas into the liquid. The diameter of the respective conduits 23 is preselected to maintain a liquid level in the trough 20 such that each of the conduits will receive substantially one-quarter of the total volume of partially rich liquid passing from the trough 20 to the coil structure 13. The pot 12 is connected to the heat exchanger 11 by a vent line 36 to receive any inert gases collected in chamber 15.

Referring more specifically to FIGURE 5, the means for conducting fluid from the absorber pot 12 includes a short conduit 24 extending through the trough 20 to have an inlet 25 thereof disposed slightly above the bottom of the trough, and an outlet 26 thereof extending downwardly through the shell 27 of the absorbor pot 12. An inlet end 28 of the conduit 23 extends upwardly through the shell 27 of the absorber pot and is spaced concentrically about the outlet 26 of the conduit 24 to define an annular passage 29 therebetween. The diameter of conduits 23 is preselected to assure a relatively high rate of flow of the liquid downwardly therethrough to the coils of absorber 13.

More specifically, it is desirable to have a relatively high flow velocity to promote heat transfer in the coil structure 13, and a high rate of absorption of the refrigerant vapor in the water to form rich liquid. Effectively, the flow in the coil structure 13 is a two phase flow, that is including both liquid and vapor phases. It has been found that the optimum velocity for such a system is that wherein a film-type flow occurs wherein the vapor flows at a relatively high velocity substantially at the center of the passage, and liquid flows in a thin film along the tube walls.

As the pressure drop increases with the velocity, the optimum velocity is limited. However, it is desirable to maintain the velocity at an optimum relatively high rate so as to maximize the efficiency of absorption of the refrigerant gas in the liquid. To this end, the absorber coil structure 13 is arranged to maintain a relatively high rate of flow notwithstanding an absorption of the refrigerant gas in the liquid as the flow continues from the conduits 23 in the coils of the absorber 13. As shown in FIGURE 2, the four conduits 23 entering the absorber 13 are turned to define a first fluid flow passage embodied into a first group of coils 30 provided in annular blocks 37. As shown in FIGURE 4, the coils 30 are connected at their opposite ends to header devices 31 which feed the liquid and gas from the coils 30 into a second fluid flow passage embodied in a single pair of coils 32 having a similar cross-section as compared to coils 30, and, thus, providing approximately one-half the total flow capacity capabilities of the four coils 30. Thus, as the total required volume has been cut down to approximately one-half, by virtue of the absorption of the refrigerant gas in the liquid, the coils 32 are correlated in flow carrying capacity with the liquid and gas requirements so that the liquid rate of flow is maintained at the high level providing maximized efficiency of absorption of the refrigerant gas therein. Subsequently, the two coils 32 are connected by another header 33 to define a single outlet conduit 34 which, again, reduces the available flow capacity of the conduit in correspondence to the requirements of the liquid with the now substantially fully absorbed refrigerant vapor dissolved therein to maintain the high rate of flow desirable to obtain maximum efficiency of absorption.

The rich liquid from conduit 34 may be delivered to the generator of the refrigeration apparatus for regeneration of the ammonia gas for use in the evaporator portion (not shown) of the refrigeration apparatus.

Thus, the invention comprehends an improved absorber apparatus 10 wherein the temperature at the inlet to the absorber is relatively high permitting maximum heat transfer from the fluid in the absorber into the rich liquid conducted through the heater coil 17 for facilitated regeneration of the ammonia refrigerant gas. The structure is arranged to maintain the ammonia gas phase in the absorber in equilibrium with the liquid phase to permit the improved functioning. The efficiency of the absorption process in apparatus 10 is further improved by the directing of the refrigerant gas into the absorbent liquid radially inwardly into the stream of absorbent liquid within the conduits 23 and absorber coil structure 13. This improved delivery of the gas for mixing with the absorbent liquid eliminates the serious and vexatious problem of gas slugs as occur in the conventional absorber structures, which slugs substantially reduce the efficiency of absorption by reducing the area of contact between the gas and liquid phases. Still further, the invention provides an improved efficiency of absorption by controlling the flow capacities of the absorber conduits in a novel manner wherein the number of conduits is progressively reduced to cause the flow capacities to correspond to the requirements of the liquid and gas volumes as the total volume decreases as a result of the absorption of the gas in the absorbent liquid. By maintaining the rate of flow at the preselected high level throughout the absorber, an improved turbulent mixing action is maintained in the liquid substantially throughout the length thereof.

Apparatus 10 provides the improved functioning discussed above, while yet the structure is extremely simple and economical of construction. The apparatus may be utilized in improving the efficiency of conventional absorber refrigerator systems including two pressure systems.

The embodiments of the invention in which an exclusive property or privilege is claimed are defined as follows:

1. Absorber apparatus for use with a liquid-gas refrigeration system, comprising: heat exchanger means for flowing hot absorbent liquid in one direction and refrigerant gas in an opposite direction in contact with said liquid to be absorbed therein; means defining a fluid flow passage and communicating with said heat exchanger to receive liquid at a high flow rate therein; and means for delivering a refrigerant gas into said passage in an annular distribution about the liquid at a preselected flow rate for absorption into the liquid therein.

2. Absorber apparatus for use with a liquid-gas refrigeration system, comprising: heat exchanger means for flowing hot absorbent liquid in one direction and refrigerant gas in an opposite direction in contact with said liquid to be absorbed therein, the heat exchanger having means for retaining the gas therein until the liquid phase and gas phase are in equilibrium at the temperature of the liquid being delivered thereto; means defining a first fluid flow passage and communicating with said heat exchanger to receive liquid at a preselected flow rate; means for delivering an absorption liquid into said passage at a preselected high liquid flow rate; means for concurrently delivering a refrigerant gas into said passage at a preselected gas flow rate for absorption into the liquid therein; and means defining a second fluid flow passage having a reduced fluid flow capacity that is less than that of said first passage and communicating with said first passage at a preselected point thereof whereat the gas volume is substantially reduced as a result of the absorption thereof into the liquid, to maintain substantially said high liquid flow rate in said second passage notwithstanding said reduced fluid flow capacity.

References Cited
UNITED STATES PATENTS

| | | | |
|---|---|---|---|
| 1,861,173 | 5/1932 | Altenkirch | 62—484 |
| 2,210,899 | 8/1940 | Campbell | 261—128 X |
| 2,592,712 | 4/1952 | Knoy | 62—491 X |
| 2,813,701 | 11/1957 | Fenger | 165—147 |

RONALD R. WEAVER, *Primary Examiner.*